US009479898B2

(12) United States Patent
Aratsu et al.

(10) Patent No.: US 9,479,898 B2
(45) Date of Patent: Oct. 25, 2016

(54) LIMITING USER OPERATIONS

(71) Applicant: International Business Machines Corporation, Armonk, NY (US)

(72) Inventors: Taku Aratsu, Tokyo (JP); Sanehiro Furuichi, Tokyo (JP); Tomohiro Shioya, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 14/517,392

(22) Filed: Oct. 17, 2014

(65) Prior Publication Data
US 2015/0121515 A1 Apr. 30, 2015

(30) Foreign Application Priority Data
Oct. 30, 2013 (JP) .................................. 2013-225168

(51) Int. Cl.
G06F 21/31 (2013.01)
G06F 21/83 (2013.01)
G06F 21/34 (2013.01)
G06F 21/36 (2013.01)
H04W 4/02 (2009.01)
G06F 21/62 (2013.01)
H04W 12/06 (2009.01)
H04L 29/06 (2006.01)

(52) U.S. Cl.
CPC ............... *H04W 4/02* (2013.01); *G06F 21/31* (2013.01); *G06F 21/6218* (2013.01); *H04W 12/06* (2013.01); *G06F 2221/2111* (2013.01); *G06F 2221/2137* (2013.01); *H04L 63/107* (2013.01)

(58) Field of Classification Search
None
See application file for complete search history.

(56) References Cited

U.S. PATENT DOCUMENTS

| 9,178,877 | B1* | 11/2015 | Koneru | H04L 63/0846 |
| 2002/0129283 | A1* | 9/2002 | Bates | G06F 21/31 726/5 |
| 2002/0137524 | A1* | 9/2002 | Bade | H04W 12/08 455/456.2 |
| 2004/0166878 | A1* | 8/2004 | Erskine | H04W 48/04 455/456.1 |
| 2009/0186633 | A1* | 7/2009 | Yonker | H04M 1/72572 455/456.6 |
| 2013/0083919 | A1* | 4/2013 | Sobue | G06F 21/62 380/28 |
| 2014/0200929 | A1* | 7/2014 | Fitzgerald | G06F 21/88 705/4 |

FOREIGN PATENT DOCUMENTS

| JP | 2004348476 A | 12/2004 |
| JP | 2005050150 A | 2/2005 |
| JP | 2007272813 A | 10/2007 |
| JP | 2009260829 A | 11/2009 |
| JP | 2011514026 A | 4/2011 |
| JP | 201208698 A | 6/2012 |

(Continued)

*Primary Examiner* — Andrew Nalven
*Assistant Examiner* — Huan V Doan
(74) *Attorney, Agent, or Firm* — Stephen R. Tkacs; Stephen J. Walder, Jr.; Richard A. Wilhelm (57) ABSTRACT

An information processing device having a lock function for restricting user operations and a mechanism executed by this information processing device are provided in which the information processing device includes: an input unit for receiving a first password and a specified location from a user; a mode setting unit for switching to a restricted mode restricting at least some of the functions of the information processing device in response to receiving the first password and location; and a releasing unit for releasing the restricted mode on condition that the information processing device has reached the specified location.

17 Claims, 10 Drawing Sheets

(56) References Cited

FOREIGN PATENT DOCUMENTS

| | | | |
|---|---|---|---|
| JP | 2012203724 A | 10/2012 |
| JP | 2013109736 A | 6/2013 |
| JP | 2013171509 A | 9/2013 |
| WO | WO0188790 A1 | 11/2001 |
| WO | WO2006101169 A1 | 11/2001 |

\* cited by examiner

LIMITING USER OPERATIONS

BACKGROUND

The present invention relates to a mechanism for limiting user operations.

Methods such as entering a password to unlock an information terminal and authenticating an information terminal using its location improve the safety of information terminals.

However, a password may be divulged to third parties when entered into an information terminal in a location where there are an unspecified number of persons.

SUMMARY

An information processing device having a lock function for restricting user operations is provided in a first illustrative embodiment in which the information processing device includes: an input unit for receiving a first password and a specified location from a user, a mode setting unit for switching to a restricted mode restricting at least some of the functions of the information processing device in response to receiving the first password and location; and a releasing unit for releasing the restricted mode on condition that the information processing device has reached the specified location. A method executed by this information processing device, and a program realizing this information processing device are also provided.

This summary of the present invention is not intended to enumerate all of the required characteristics of the present invention. The present invention may be realized by any combination or sub-combination of these characteristics.

DETAILED DESCRIPTION

The following is an explanation of the present invention with reference to an embodiment of the present invention. However, the present embodiment does not limit the present invention in the scope of the claims. Also, all combinations of characteristics explained in the embodiment are not necessarily required in the technical solution of the present invention.

Figure 1:
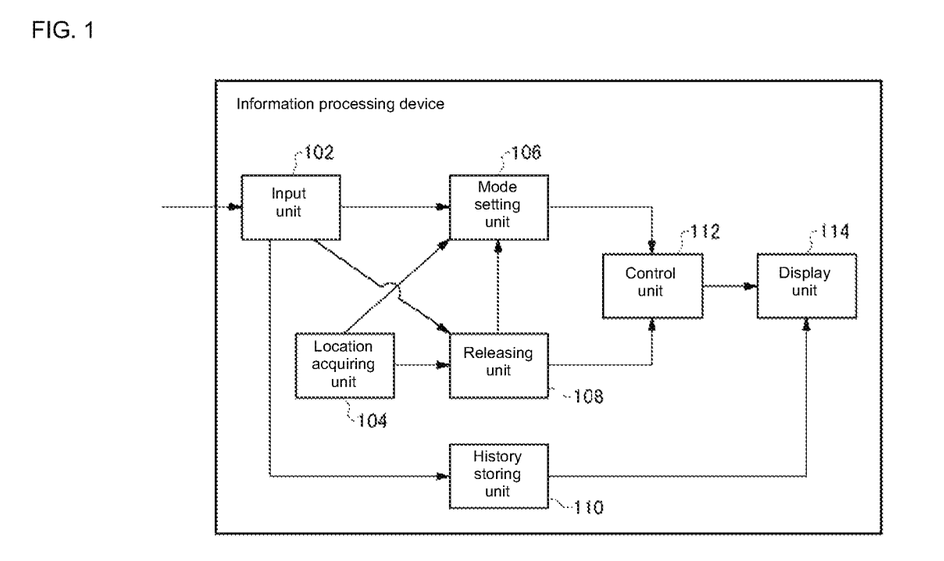
FIG. 1 shows the configuration of an information processing device in an embodiment.

FIG. 1 shows the configuration of the information processing device in an embodiment. The information processing device receives a highly secure password from the user in advance, ends the preauthentication process, limits user operations after preauthentication until a destination has been reached, and releases the restrictions when the destination has been reached. The information processing device includes an input unit 102, a location acquiring unit 104, a mode setting unit 106, a releasing unit 108, a history storing unit 110, a control unit 112, and a display unit 114.

The input unit 102 is connected to input devices such as a mouse, keyboard and touch pad, and receives various operations from the user. For example, the input unit 102 receives from the user a first password and a second password that is different from the first password. The input unit 102 also receives from the user a location specified by the user as a destination to be reached, a route traveled to reach the specified location, and a transit point along the route to the specified location. The input unit 102 may receive a location selected by the user from a history of specified locations that have been selected by the user in the past.

The input unit 102 supplies the first password, the specified location, the route traveled, and the transit point to the mode setting unit 106 and the releasing unit 108, and supplies the second password to the releasing unit 108. The input unit 102 also supplies the specified location, the route traveled and the transit point to the history storing unit 110.

The location acquiring unit 104 acquires the current location of the information processing device from a positioning device such as GPS and/or Wi-Fi, and supplies the acquired current location to the mode setting unit 106 and the releasing unit 108.

The mode setting unit 106 switches the information processing device from the available state to a restricted mode which restricts at least some of the functions of the information processing device 10 that can be used in the available state. For example, the mode setting unit 106 switches the information processing device to the restricted mode in response to receiving from the input unit 102 the first password and a specified location in the preauthentication process.

The mode setting unit 106 also switches the information processing device to a locked state. For example, the mode setting unit 106 releases the restricted mode and locks the information processing device when it has been determined that the information processing device is no longer secure such as when the distance between the current location and the route inputted by the input unit 102 during the preauthentication process exceeds a predetermined threshold value. When the device has been switched to the restricted mode or a locked state, the mode setting unit 106 notifies the control unit 112.

The releasing unit 108 releases the restricted mode, and the information processing device enters the available state. For example, the releasing unit 108 releases the restricted mode on condition that the information processing device has reached the specified location. The releasing unit 108 may also release the restricted mode on further condition that the second password has been received by the input unit 102 at the location designated by the user.

The releasing unit 108 unlocks the information processing device when the first password is entered during the locked state. In this way, the releasing unit 108 makes the information processing device available for use. When the restricted mode is released or the locked state is released, the releasing unit 108 notifies the mode setting unit 106 and the control unit 112.

The history storing unit 110 stores a history of the specified locations entered by the user during the preauthentication process. The history storing unit 110 supplies the stored history to the display unit 114.

The control unit 112 controls the entire information processing device, and permits or prohibits use of functions by the user in response to the state of the information processing device. For example, the control unit 112 permits use of all functions in the information processing device in the available state, restricts the use of at least some functions of the information processing device in the restricted mode, and may prohibit use of all functions of the information processing device in the locked state.

The display unit 114 is controlled by the control unit 112 and displays a display screen on the information processing device. During the preauthentication process, the display unit 114 displays a preauthentication screen into which the first password is entered and a location is specified by the user. The display unit 114 may also display on the preauthentication screen a history of locations specified by the user which has been stored in the history storing unit 110. The display unit 114 may be provided with a touch panel which serves as the input unit 102.

In response to receiving the first password and a specified destination in the preauthentication process, the information processing device switches to the restricted mode in which some of the functions of the device are not available. In response to reaching the specified destination, the device switches to the available state.

Because the information processing device releases the function restrictions after reaching a destination without the first password being entered, the first password is not divulged at the destination. Until the specified destination has been reached, the information processing device also prevents unauthorized use by third parties in the restricted mode. In addition, the information processing device switches from the restricted mode to the locked state when the device is deemed unsafe in the restricted mode, and this also prevents unauthorized use by third parties.

Figure 2:
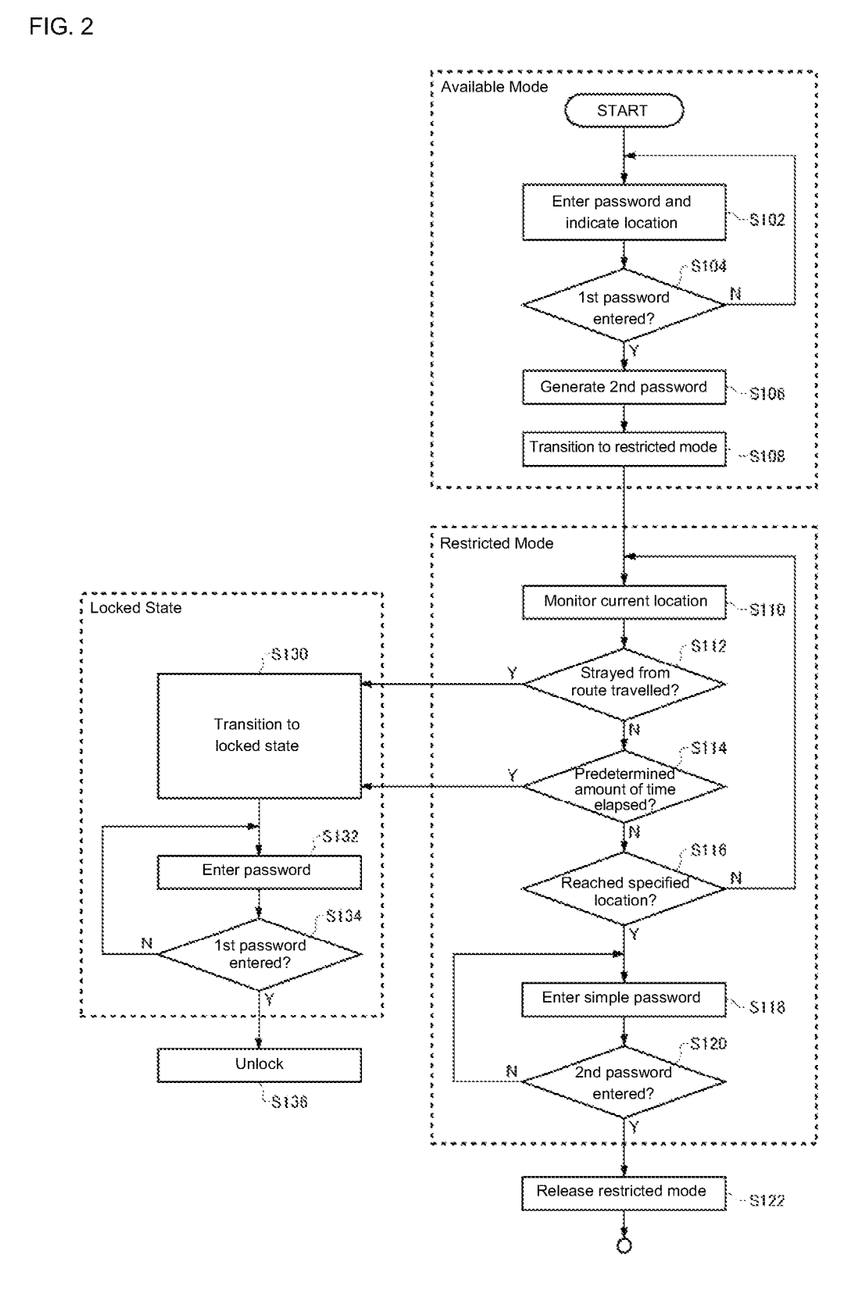
FIG. 2 is a flowchart of processing performed by the information processing device in accordance with an illustrative embodiment.
Figure 3:
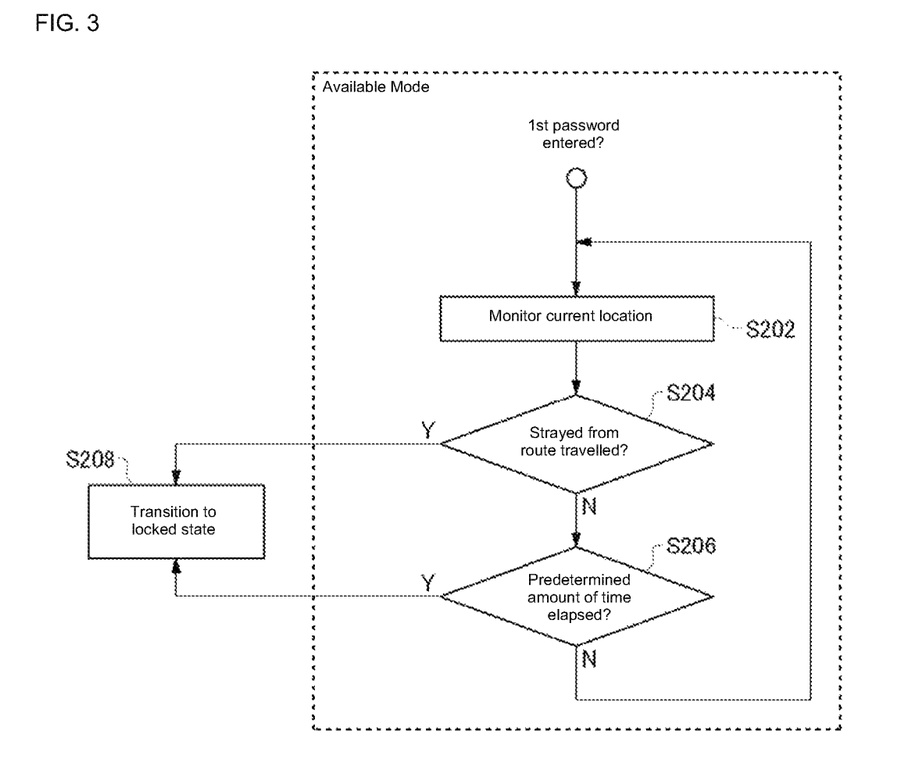
FIG. 3 is a flowchart of processing performed by the information processing device in accordance with an alternative embodiment.

FIG. 2 and FIG. 3 are flowcharts of the processing performed by the information processing device in the present embodiment. Step S102 through Step S136 in FIG. 2 is the flow of processing performed by the information processing device from preauthentication until the information processing device has reached the specified destination.

First, in Step S102, the display unit 114 displays the preauthentication screen, and the input unit 102 receives from the user on the preauthentication screen a first password, a specified location or destination to be reached by the user, and the route traveled to reach the specified location.

The input unit 102 may also receive a specified location inputted directly by the user from, for example, a street address. Alternatively, the display unit 114 may acquire a history of specified locations selected by the user in the past from the history storing unit 110 to display on the preauthentication screen the locations included in the history as candidates. The input unit 102 then receives a location selected by the user from the available candidates as the specified location.

The input unit 102 may receive from the user a transit point passed on the way to the specified location instead of a traveled route. The input unit 102 may also receive from the user a time period or actual time the user will be at the destination. The input unit 102 supplies the first password and other information received to the mode setting unit 106 and the releasing unit 108.

Next, in Step S104, the mode setting unit 106 determines whether or not the first password received from the user is correct. When the first password is correct, that is, the first password matches a predetermined string, the mode setting unit 106 advances the process to Step S106. When the first password is not correct, the mode setting unit 106 returns the process to Step S102 to allow the user to enter the first password once again.

In Step S106, the releasing unit 108 generates a second password that can be entered in fewer operations than the first password. For example, the releasing unit 108 may create a second password by extracting a portion of the string constituting the first password, such as the first half or the second half. Alternatively, the releasing unit 108 may generate a one-time password with fewer characters than the first password for use as the second password.

Alternatively, the releasing unit 108 may generate, as a second password, an operation in which some regions of the touch panel in the information processing device are traced in a predetermined sequence. The releasing unit 108 supplies the second password to the control unit 112, and the second password is displayed on the display unit 114.

Next, in Step S108, the mode setting unit 106 switches the information processing device to the restricted mode. Here, the mode setting unit 106 may switch to the restricted mode after another operation has been received from the user via the input unit 102 to switch to the restricted mode. The mode setting unit 106 then notifies the control unit 112 that the device has been switched to the restricted mode.

In the restricted mode, the control unit 112 restricts at least some of the functions of the information processing device. For example, in the restricted mode, the control unit 112 may prevent at least some applications in the information processing device from being executed. In the restricted mode, the control unit 112 may also prevent at least some files in the information processing device from being accessed. The control unit 112 may also restrict use of any and all functions in the information processing device during the restricted mode.

Next, in Step S110, the location acquiring unit 104 acquires the current location of the information processing device via, for example, GPS, and supplies the current location to the mode setting unit 106 and the releasing unit 108. In this way, the mode setting unit 106 and the releasing unit 108 are able to monitor the current location of the information processing device.

Next, in Step S112, the mode setting unit 106 determines whether or not the information processing device has departed from the route traveled. For example, the mode setting unit 106 determines whether or not the distance between the current location of the information processing device and the route entered in Step S102 exceeds a predetermined distance. When it has been determined that the device has departed from the traveled route, the mode setting unit 106 advances the process to Step S130. If not, the process is advanced to Step S114.

Next, in Step S114, the mode setting unit 106 determines whether or not a predetermined period of time has elapsed. For example, the mode setting unit 106 determines whether or not a predetermined lock period has elapsed since the device was switched into restricted mode, and/or whether or not a predetermined lock time has been reached. When the predetermined period of time has elapsed, the mode setting unit 106 advances the process to Step S130. If not, the process is advanced to Step S116.

In Step S116, the releasing unit 108 determines whether or not the information processing device has reached the specified location. For example, the releasing unit 108 determines whether or not the current location of the information processing device is within a predetermined distance of the location specified in Step S102. When the releasing unit 108 has determined that the information processing device has reached the specified location, the process advances to Step S118. If not, the process returns to Step S110.

The releasing unit 108 may also advance the process to Step S118 on condition that the information processing device has reached the location specified in Step S102 via the route traveled and transit point entered in the same step. If these conditions are not satisfied, the process may be returned to Step S110. Here, the releasing unit 108 may advance the process to Step S130 instead of Step S110 when the information processing device has reached the specified location but not via the specified route or transit point.

In Step S118, the input unit 102 receives from the user a second password which is a simpler password. The input unit 102 supplies the received second password to the releasing unit 108.

Next, in Step S120, the releasing unit 108 determines whether or not the second password received from the user is correct. When the second password is correct, that is, the second password matches the predetermined string, the releasing unit 108 advances the process to Step S122. When the second password is not correct, the releasing unit 108 returns the process to Step S118. The releasing unit 108 may advance the process to Step S130 instead of advancing the process to Step S118.

In Step S122, the releasing unit 108 releases the restricted mode and switches the information processing unit to the available state.

In Step S130, the mode setting unit 106 may release the restricted mode and switch the information processing unit to the locked state. The mode setting unit 106 notifies the control unit 112 that the device has been switched to the locked state.

In the locked state, the control unit 112 restricts use of all functions of the information processing device except for entering passwords. For example, in the locked state, the control unit 112 disables all applications in the information processing device and restricts access to all files.

Next, in Step S132, the input unit 102 receives the first password entered by the user. The input unit 102 supplies the received first password to the releasing unit 108.

Next, in Step S134, the releasing unit 108 determines whether or not the first password received from the user is correct. When the first password is correct, that is, the first password matches the predetermined string, the releasing unit 108 advances the process to Step S136. When the first password is not correct, the releasing unit 108 returns the process to Step S132 to allow the user to enter the first password once again. When the user has incorrectly entered the first password a predetermined number of times, the releasing unit 108 may display a warning on the display unit 114 and prevent entry of a first password into the input unit 102.

In Step S136, the releasing unit 108 unlocks the information processing device and enables the information processing device to be used. The releasing unit 108 unlocks the device in response to receiving the first password. The releasing unit 108 notifies the mode setting unit 106 and the control unit 112 that the device has entered the available state.

After the information processing device in the present embodiment has executed the preauthorization process in Step S102 through Step S108 and the user has entered the first password and specified a location, the device enters the restricted mode. When the device reaches the specified location while in the restricted mode during Steps S110 through Step 120, the device is released from restricted mode and switched to the available state in Step S122.

A first password is entered into the information processing device during the preauthorization process, but is released from the restricted mode when the device has reached the destination by entering a second password which is simpler than the first password. As a result, security is maintained during transit, and the first password is not divulged and the restricted functions are made available using a simple operation at the destination. This allows the information processing device to be used safely when the destination of the information processing device is a place where it is difficult to enter the more complicated first password such as a job site.

The information processing device releases the restricted mode on condition that the specified location has been reached via the route traveled. The information processing device also releases the restricted mode and switches to a locked state when a predetermined period of time has elapsed in the restricted mode or the device has departed from the specified route. In this way, the information processing device is not released from the restricted mode when the destination is reached via a route other than the specified route. This further increases safety with respect to unauthorized use by third parties.

When the information processing device has switched to the locked state, it can be switched to the available state if the user enters the first password. In this way, the functions of the information processing device which are restricted in the locked state can be made available again when the authorized user makes a mistake and the information processing device switches to the locked state.

Step S202 through Step S208 in FIG. 3 shows the processing flow performed after the information processing device has reached the specified destination.

In Step S202, the location acquiring unit 104 acquires the current location of the information processing device, and supplies the current location to the mode setting unit 106. In this way, the mode setting unit 106 can monitor the current location of the information processing device.

Next, in Step S204, the mode setting unit 106 determines whether or not the information processing device has departed from the specified location. For example, the mode setting unit 106 determines whether or not the distance between the current location of the information processing device and the location specified in Step S102 exceeds a predetermined distance. When the mode setting unit 106 has determined that the device has departed from the specified location, the process is advanced to Step S208. If not, the process is advanced to Step S206.

Next, in Step S206, the mode setting unit 106 determines whether or not a predetermined period of time has elapsed. For example, the mode setting unit 106 determines whether or not a certain period of time has elapsed at the destination entered in Step S102 since the restricted mode was released in Step S122 or a certain time has been exceeded. When the predetermined period of time has elapsed, the mode setting unit 106 advances the process to Step S208. If not, the process is returned to Step S202.

In Step S208, the mode setting unit 106 may lock the information processing device. After the information processing device has been locked, a process similar to Step S132 through Step S136 may be executed. Instead of locking the information processing device, the mode setting unit 106 may switch the information processing device to the restricted mode. The mode setting unit 106 notifies the control unit 112 that the device has been switched to the locked state or the restricted mode.

Thus, the mode setting unit 106 switches the information processing device in the present embodiment to the restricted mode or the locked state in response to a predetermined period of time elapsing since the restricted mode was released. By restricting the functions that can be used when, for example, the user exceeds a predetermined period of time at the destination, the safety of the information processing device is improved with respect to third parties.

Figure 4:
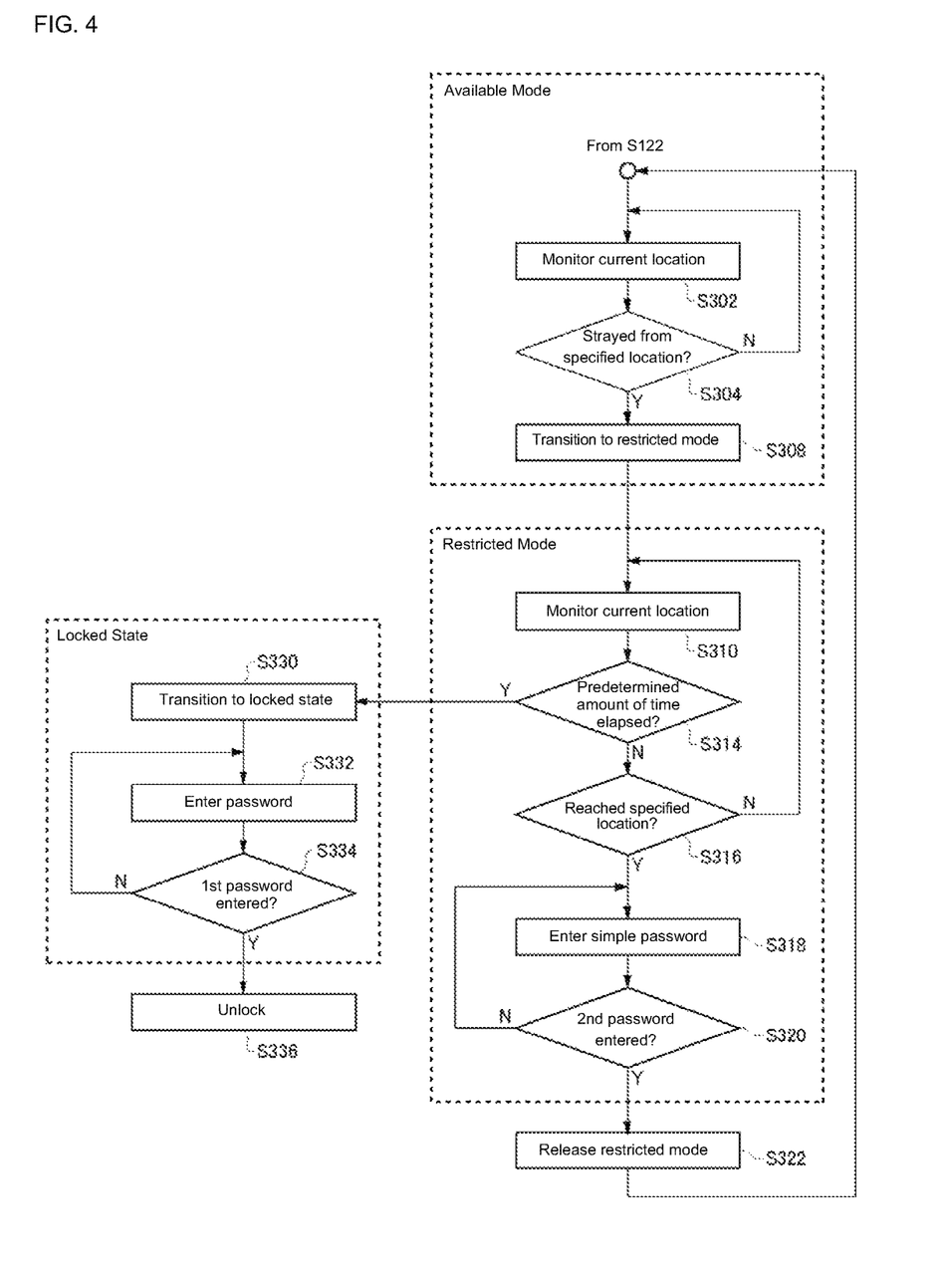
FIG. 4 is a flowchart of processing performed by the information processing device in a first modified example of an illustrative embodiment.

FIG. 4 is a flowchart of the processing performed by the information processing device in a first modified example of the present embodiment. In this modified example, the information processing device switches successively to the restricted mode and the locked state in response to the state after the destination has been reached. The information processing device in this modified example, executes the process in Step S302 after the process in Step S122 has been performed.

In Step S302, the location acquiring unit 104 acquires the current location of the information processing device, and supplies the current location to the mode setting unit 106. In this way, the mode setting unit 106 can monitor the current location of the information processing device.

Next, in Step S304, the mode setting unit 106 determines whether or not the information processing device has departed from the specified location. For example, the mode setting unit 106 determines whether or not the distance between the current location of the information processing device and the location specified in Step S102 exceeds a predetermined distance. When the mode setting unit 106 has determined that the device has departed from the specified location, the process is advanced to Step S308. If not, the process is returned to Step S302.

In Step S308, the mode setting unit 106 switches the information processing device to the restricted mode. The mode setting unit 106 notifies the control unit 112 that the device has been switched to restricted mode.

Next, in Step S310, the location acquiring unit 104 acquires the current location of the information processing device, and supplies the current location to the releasing unit 108. In this way, the releasing unit 108 can monitor the current location of the information processing device.

Next, in Step S314, the mode setting unit 106 determines whether or not a predetermined period of time has elapsed. For example, the mode setting unit 106 determines whether or not a certain period of time has elapsed at the destination entered in Step S102 since the restricted mode was released in Step S122 or a certain time has been exceeded.

Also, in Step S102, the input unit 102 may receive a time in which the information processing unit may be away from the destination which is separate from the time period at the destination, and the mode setting unit 106 may determine whether or not the time away has elapsed since the device was released from the restricted mode in Step S122. When the mode setting unit 106 has determined that a predetermined period of time has elapsed, the process is advanced to Step S330. If not, the process is advanced to Step S316.

In Step S316, the releasing unit 108 determines whether or not the information processing device has reached the specified location, that is, has returned to the original destination. For example, the releasing unit 108 determines whether or not the current location of the information processing device is within a predetermined distance of the location inputted in Step S102. When the releasing unit 108 has determined that the information processing device has reached the specified location, the process advances to Step S318. If not, the process may return to Step S310.

In Step S318, the input unit 102 receives the second password from the user. The input unit 102 supplies the received second password to the releasing unit 108.

Next, in Step S320, the releasing unit 108 determines whether or not the second password received from the user is correct. When the second password is correct, that is, the second password matches a predetermined string or operation, the releasing unit 108 advances the process to Step S322. When the second password is not correct, the releasing unit 108 returns the process to Step S318. Here, the releasing unit 108 may advance the process to Step S330 instead of returning the process to Step S318.

In Step S322, the releasing unit 108 releases the restricted mode so that the information processing device may be used once again.

In Step S330, the mode setting unit 106 may release the restricted mode and lock the information processing device. The mode setting unit 106 notifies the control unit 112 that the device has been locked.

Next, in Step S332, the input unit 102 receives a first password from the user. The input unit 102 supplies the received first password to the releasing unit 108.

Next, in Step S334, the releasing unit 108 determines whether or not the first password received from the user is correct. When the first password is correct, that is, the first password matches a predetermined string, the releasing unit 108 advances the process to Step S336. When the first password is not correct, the releasing unit 108 returns the process to Step 332 to allow the user to enter the first password once again using the input unit 102. When the user has incorrectly entered the first password a predetermined number of times, the releasing unit 108 may display a warning on the display unit 114 and prevent entry of a first password into the input unit 102.

In Step S336, the releasing unit 108 unlocks the information processing device and enables the information processing device to be used. The releasing unit 108 notifies the mode setting unit 106 and the control unit 112 that the device has entered the available state.

In the information processing device of this modified example, the mode setting unit 106 returns the device to the restricted mode when the device has departed more than a predetermined distance from the destination after the restricted mode was released. By restricting the functions that can be used in the information processing device when the device has left the specified location, security is improved with respect to third parties.

The information processing device in this modified example is switched to the restricted mode after reaching the destination, and locked after remaining at the location for a predetermined period of time. By further restricting the functions of the information processing device when the information processing device has not returned to the destination after entering the restricted mode, security with respect to third parties is improved even further.

When the information processing device in this modified example has been switched to the restricted mode after reaching the destination, it can be restored to the available mode if the user returns the device to the specified destination and enters the second password. In this way, the functions of the information processing device can be restored using a simple operation when, for example, the user has gone to another location for a brief period of time after reaching the destination.

The information processing device may receive an updating operation of the lock period or lock time in the restricted mode. Here, before the processing in Step S110, the input unit 102 receives the updating operation of the lock period or lock time, and supplies the updating operation to the mode setting unit 106. The mode setting unit 106 updates the new lock period or lock time in response to this updating operation.

The information processing device in the present embodiment may receive fingerprint information instead of a character string as the first password from the input unit 102, and fingerprint authentication may be performed by the releasing unit 108. In this case, the information processing device has to be connected to a fingerprint authenticating device. In the present embodiment, however, the information processing device performs the fingerprint authentication in advance and there is no need to take a fingerprint authenticating device to the destination.

Figure 5:
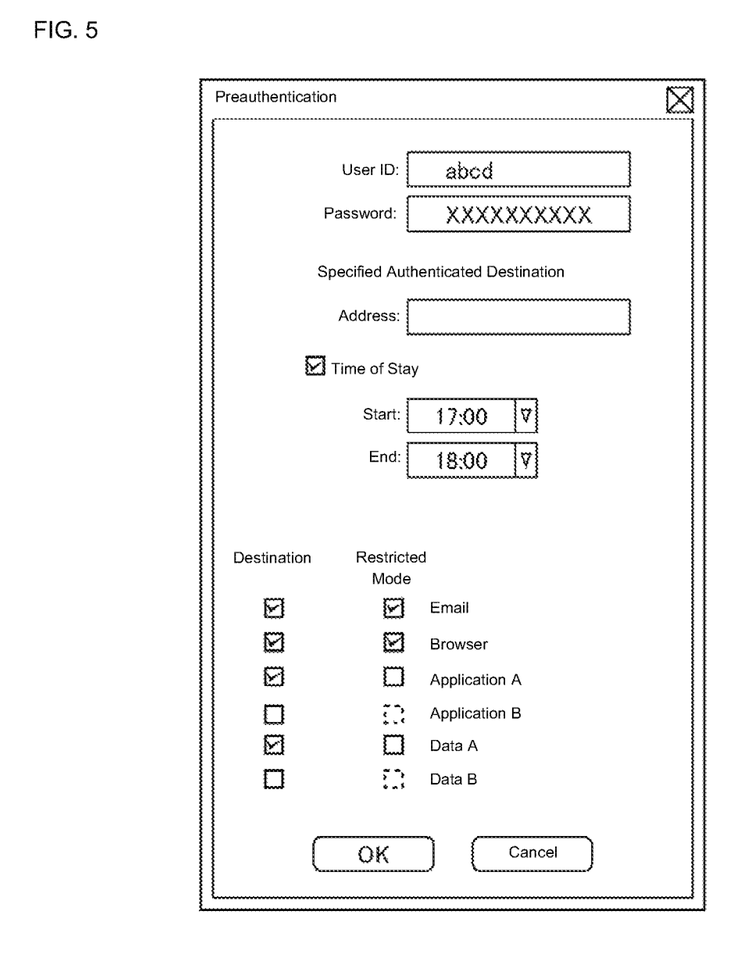
FIG. 5 is an example of a preauthentication screen displayed by a display unit in an illustrative embodiment.

FIG. 5 is an example of a preauthentication screen displayed by the display unit 114 in the present embodiment. In the processing performed in Step S102, the display unit 114 displays the user ID, first password, specified destination location, and intended time of stay in which the information processing device has to be available at the destination on the preauthentication screen. A checkbox is displayed on the display unit 114 to indicate whether or not a time of stay at the destination is to be entered, and any time of stay can be entered. Instead of the time of stay, the display unit 114 may display on the preauthentication screen a period of stay ranging from arrival at the destination to the end of the time in which the information processing device needs to be made available.

Checkboxes can also be displayed by the display unit 114 indicating the functions that can be used during the period of use at the destination and the functions that can be used in the restricted mode. Functions that are specified for use in the available state on the display unit 114 may not be specifiable in the restricted mode.

For example, as shown in FIG. 5, functions that are specified for use in the available mode include the email function, the browser function, access to application A, and access to data A. In the restricted mode, the email function and the browser function are specified as available.

Figure 6:
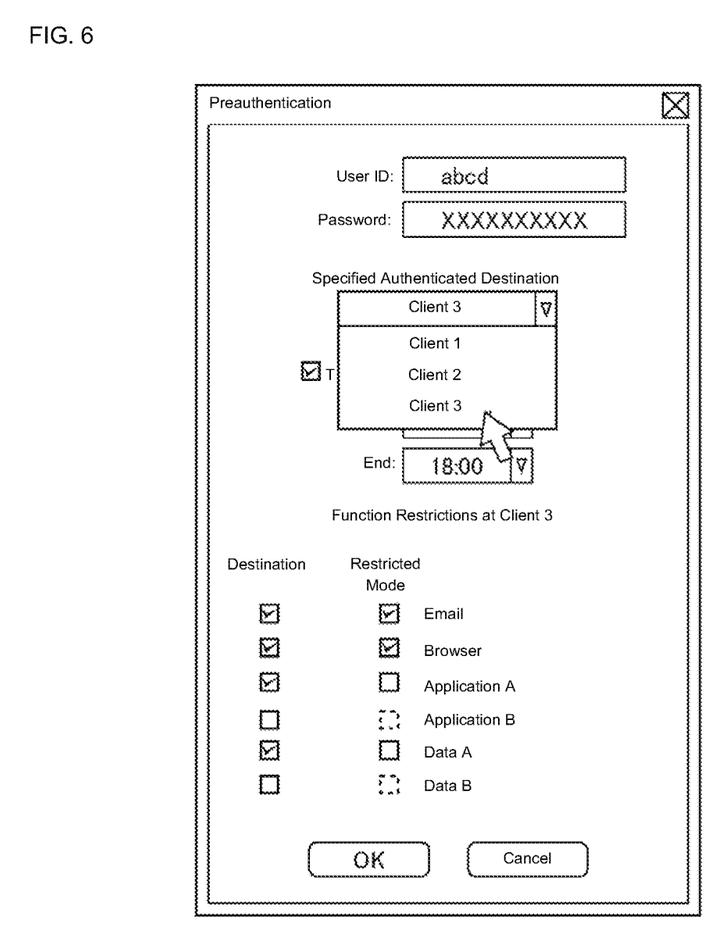
FIG. 6 is an example of a preauthentication screen displayed by a display unit in a second modified example of the present embodiment.

FIG. 6 is an example of a preauthentication screen displayed by the display unit 114 in a second modified example of the present embodiment. In this modified example, the display unit 114 displays on the preauthentication screen candidates to be selected by the user as locations to be visited, and the user selects one of them. As shown in FIG. 6, the display unit 114 displays Client 1, Client 2 and Client 3 as candidates to be visited.

The display unit 114 may also display checkboxes for prespecification of functions available at each place visited, functions available in the restricted mode. For example, the display unit 114 acquires from the history storage unit 110 a history of locations specified in the past, and functions made available in the past at the specified location and in the restricted mode, and checkboxes indicating the visited sites and specified functions for each site in the history.

When, as shown in the drawing, the user selects Client 3 as the site to be visited, the display unit 114 may display checkboxes prespecifying the functions that were available in the past at Client 3 and the functions that were available in the restricted mode.

In this way, the information processing device in this modified example allows the user to set the functions restricted at each site visited with greater precision. For example, when a place with an unspecified number of people present has been selected as the destination, the information processing device reduces the number of available functions to increase security. When the destination is a location with specified people present such as a conference room, the number of available functions is increased to improve user convenience.

In FIG. 5 and FIG. 6, the user of the information processing device was able to directly enter the functions available in the restricted mode and the available state. However, the information processing device may communicate with an outside device and the outside device may set the functions that can be used in the restricted mode and in the available state. In this way, the administrator of the information processing device can set the functions that are available to the user on the road. The information processing device may also be placed into restricted mode or locked by an outside device. In this way, security can be enhanced to protect in-house functions when, for example, the information processing device is lost.

Figure 7:
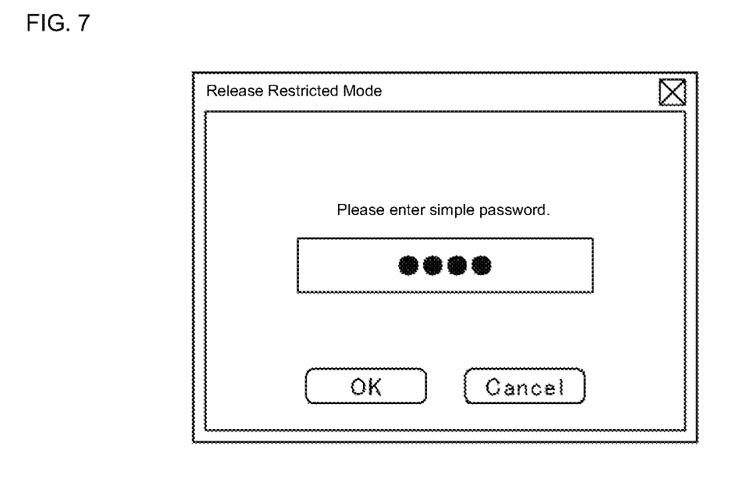
FIG. 7 is an example of a restricted mode release screen displayed by the display unit in accordance with an example embodiment.

FIG. 7 is an example of a restricted mode release screen displayed by the display unit 114. In Step S118 and Step S318, the display unit 114 displays the restricted mode release screen shown in FIG. 7, and prompts the user to enter the second password which is a simple password. The second password received by the input unit 102 may be a short four-character string as shown in the drawing.

Figure 8:
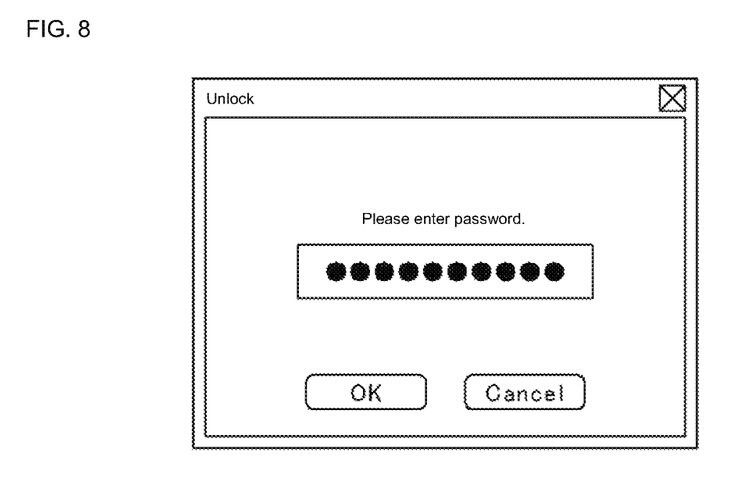
FIG. 8 is an example of a locked state release screen displayed by the display unit in accordance with an example embodiment.

FIG. 8 is an example of a locked state release screen displayed by the display unit 114. In Step S132 and Step S332, the display unit 114 displays the locked state release screen shown in FIG. 8, and prompts the user to enter the first password. The first password received by the input unit 102 may be a long ten-character string as shown in the drawing.

Figure 9:
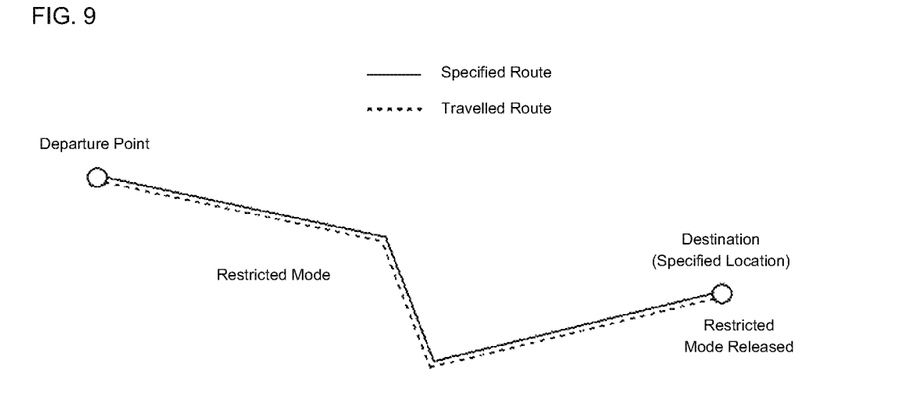
FIG. 9 illustrates an example of function restrictions while an information processing device is in transit in accordance with an illustrative embodiment.

FIG. 9 is an example of function restrictions while the information processing device is in transit. When the preauthentication has ended at the departure point, the information processing device is carried via a traveled route specified during preauthentication to the location specified as the destination during preauthentication. Therefore, after preauthentication has ended, the information processing device remains in the restricted mode until the destination has been reached. The information processing device is released from restricted mode and made available when the destination has been reached and the second password has been entered.

Figure 10:
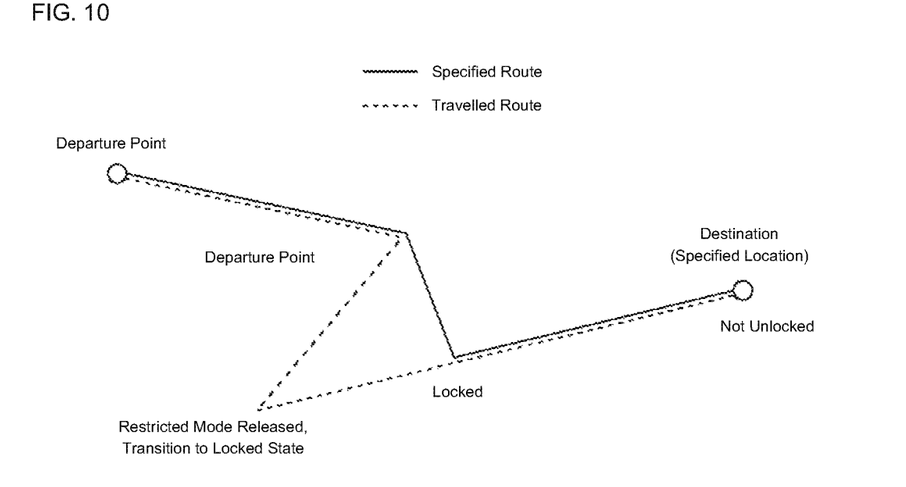
FIG. 10 illustrates another example of function restrictions while the information processing device is in transit in accordance with an illustrative embodiment.

FIG. 10 is another example of function restrictions while the information processing device is in transit. When the preauthentication has ended at the departure point, the information processing device is carried via the travel route specified during preauthentication. However, the device is carried during transit to a location off of the specified route before returning to the specified route and reaching the location specified as the destination.

In this case, the information processing device remains in the restricted mode from the end of the preauthentication process to the point at which the device is a predetermined distance from the specified route. When the information processing device reaches the point at which it is a predetermined distance from the specified route, it enters a locked state until the destination has been reached. The information processing device is not released from the restricted mode even when the information processing device reaches the destination. In this situation, the information processing device is released from the locked state and enters the available state on condition that the first password has been entered.

Alternatively, the information processing device may be switched back to the restricted mode once it returns to the specified route after departing from the specified route. In this case, the information processing device may be released from the restricted mode and switched to the available mode on condition that the second password has been entered at the destination.

Figure 11:
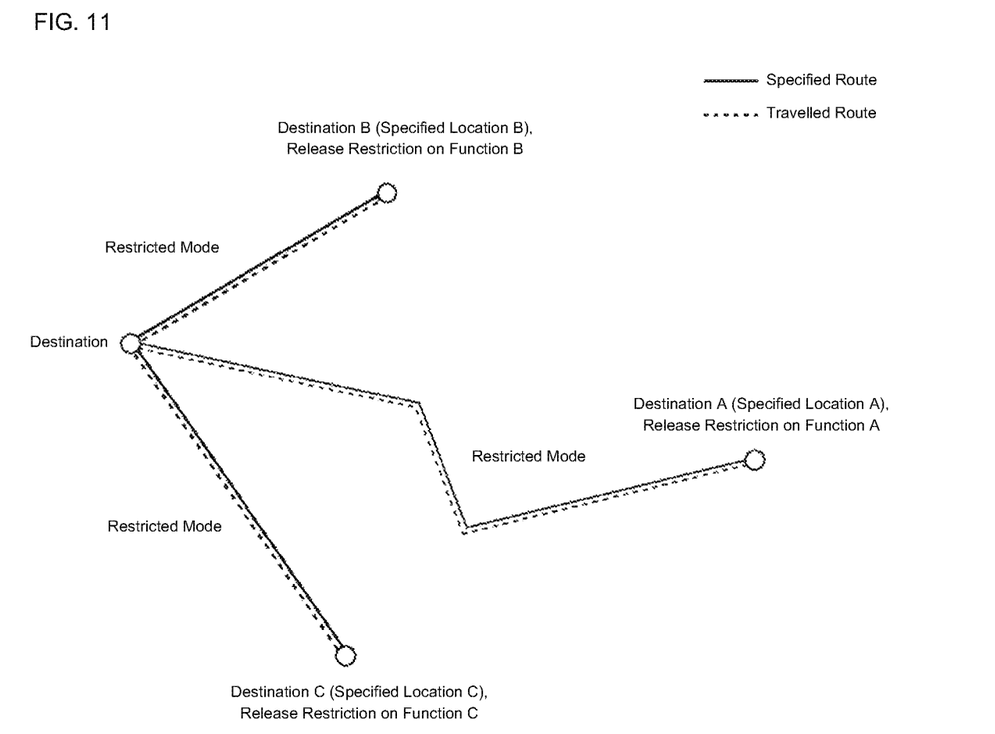
FIG. 11 illustrates an example of function restrictions while the information processing device is in transit in accordance with an alternative embodiment.

FIG. 11 is an example of function restrictions while the information processing device in a third modified example is in transit. Multiple destinations are set in the information processing device of this modified example. Not all functions restricted in the restricted mode are available at a destination. Only some predetermined functions are made available depending on the destination. For example, multiple locations are specified as destinations by the input unit 102, and the releasing unit 108 releases the restrictions on some of the functions in the restricted mode depending on the location that has been reached on condition that one of the specified locations has been reached.

For example, the information processing device may restrict use of Function A, Function B and Function C in the restricted mode, make Function A available when Destination A has been reached, make Function B available when Destination B has been reached, and make Function C available when Destination C has been reached.

The information processing device in this modified example allows the user to use the appropriate function at each destination. For example, when the information processing device is carried to the offices of various clients, data related to other clients is not displayed on the information processing device in front of a client.

Figure 12:
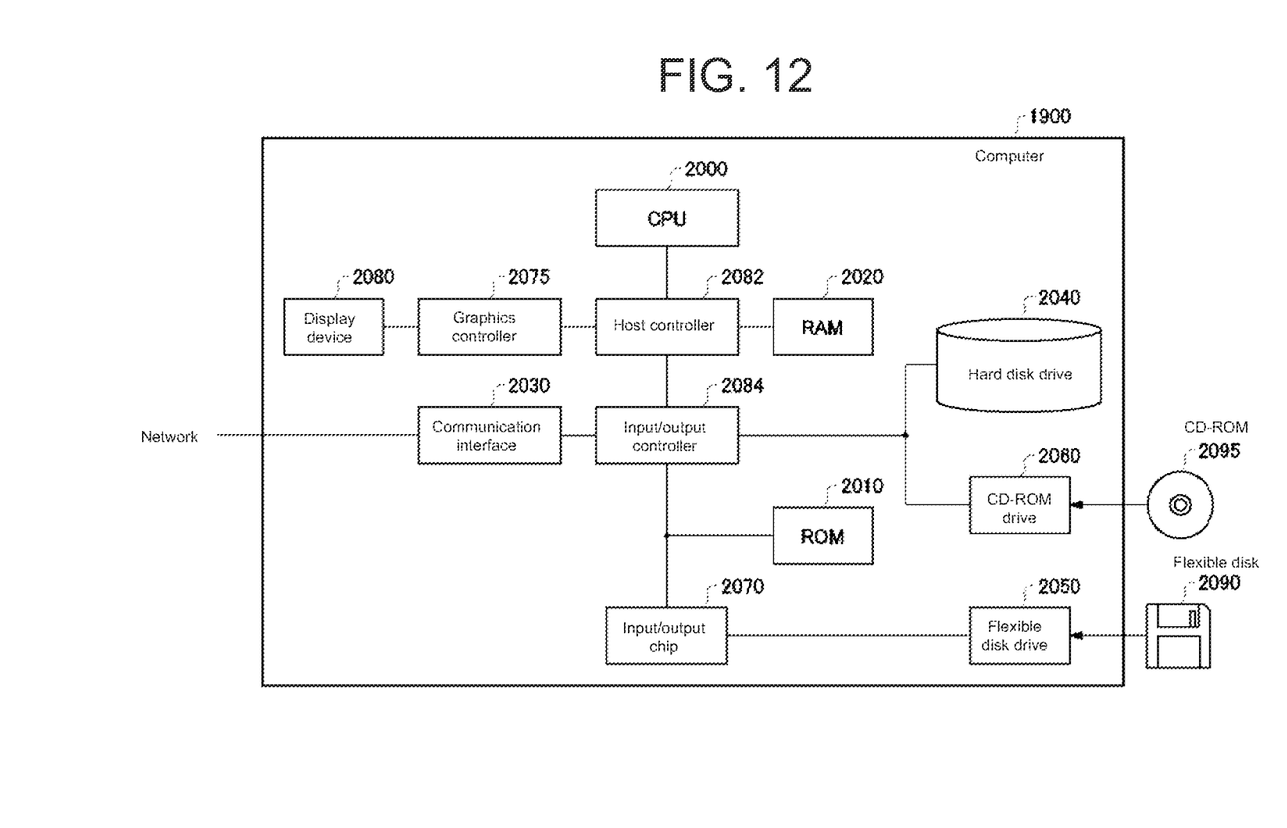
FIG. 12 shows an example of a hardware configuration for a computer in accordance with an illustrative embodiment.

FIG. 12 shows an example of a hardware configuration for the computer 1900 functioning as the information processing device. The computer 1900 in the present embodiment is equipped with a CPU peripheral portion having a CPU 2000, RAM 2020, graphics controller 2075 and display device 2080 connected to each other by a host controller 2082, an input/output portion having a communication interface 2030, a hard disk drive 2040 and a CD-ROM drive 2060 connected to the host controller 2082 by an input/output controller 2084, and a legacy input/output portion having a ROM 2010, flexible disk drive 2050, and input/output chip 2070 connected to the input/output controller 2084.

The host controller 2082 is connected to RAM 2020, a CPU 2000 accessing the RAM 2020 at a high transfer rate, and a graphics controller 2075. The CPU 2000 is operated on the basis of a program stored in the ROM 2010 and the RAM 2020, and controls the various units.

The graphics controller 2075 acquires from the display unit 114 the image data generated in the frame buffer of the RAM 2020 by the CPU 2000 and other units, and displays this image data on the display device 2080. Alternatively, the graphics controller 2075 can include a frame buffer for storing image data generated by the CPU 2000 and other units.

The input/output controller 2084 is connected to a host controller 2082, a communication interface 2030 serving as a relatively high-speed input/output device, a hard disk drive 2040, and a CD-ROM drive 2060. The communication interface 2030 communicates with the other devices via a wired or wireless network.

The communication interface also functions as hardware in the system for communicating with the outside. The hard disk drive 2040 stores the programs and data used by the CPU 2000 in the computer 1900. The CD-ROM drive 2060 reads programs and data from the CD-ROM 2095 and provides them to the hard disk drive 2040 via the RAM 2020.

The input/output controller 2084 is connected to the ROM 2010, the flexible disk drive 2050, and the relatively low-speed input/output device of the input/output chip 2070. The ROM 2010 stores the boot program executed by the computer 1900 at startup and/or programs relying on hardware in the computer 1900.

The flexible disk drive 2050 reads programs or data from a flexible disk 2090, and provides the programs and data to the hard disk drive 2040 via the RAM 2020. The input/output chip 2070 connects the flexible disk drive 2050 to the input/output controller 2084, and various types of input/output device are connected to the input/output controller 2084 via a parallel port, serial port, keyboard port, or mouse port, etc.

A program provided to the hard disk drive 2040 via the RAM 2020 is stored on a recording medium such as a flexible disk 2090, CD-ROM 2095 or IC card, and provided by the user. A program is read from the recording medium, installed in the hard disk drive 2040 inside the computer 1900 via the RAM 2020, and executed by the CPU 2000.

Programs for the information processing device are installed in the computer 1900 to enable the computer 1900 to function as an input module, a location acquiring module, a mode setting module, a cancellation module, a history storing module, a control module, and a display module. These programs or modules may work with the CPU 2000 and other components to cause the computer 1900 to function as the input unit 102, the location acquiring unit 104, the mode setting unit 106, the releasing unit 108, the history storing unit 110, the control unit 112, and the display unit 114.

The information processing steps written in these programs are specific means activated by reading the programs to the computer 1900 so that the software cooperates with the various types of hardware resources described above. These specific means function as the input unit 102, the location acquiring unit 104, the mode setting unit 106, the releasing unit 108, the history storing unit 110, the control unit 112, and the display unit 114. These specific means realize operations and the processing of information in the computer 1900 of the present embodiment to construct a specific information processing device for this intended purpose.

For example, when the computer 1900 communicates with an external device, the CPU 2000 executes the communication program loaded in the RAM 2020, and instructs the communication interface 2030 in the communication processing on the basis of the processing content described in the communication program.

The communication interface 2030 is controlled by the CPU 2000, and reads the transmitted data stored in the transmission buffer region of a memory device such as the RAM 2020, hard disk drive 2040, flexible disk 2090 or CD-ROM 2095, or writes reception data received from the network to a reception buffer region of the storage device.

In this way, the communication interface 2030 transfers transmitted and received data to a storage device using the direct memory access (DMA) method. Alternatively, the CPU 2000 transfers transmitted and received data by reading data from the source storage device or communication interface 2030, and transfers and writes data to the destination communication interface 2030 or storage device.

Also, the CPU 2000 writes all of the data or the necessary data to the RAM 2020 via, for example, a DMA transfer, from files or databases stored in an external storage device such as a hard disk drive 2040, a CD-ROM drive 2060 (CD-ROM 2095) or a flexible disk drive 2050 (flexible disk 2090), and performs various types of processing on the data in the RAM 2020.

The CPU 2000 then writes the processed data to the external storage device via, for example, a DMA transfer. Because the RAM 2020 temporarily stores the contents of the external storage device during this process, the RAM 2020 and the external storage device are generally referred to in the present embodiment as memory, a storage unit, or a storage device.

The various types of information in the programs, data, tables and databases of the present embodiment are stored in these memory devices, and are the targets of information processing. The CPU 2000 can hold some of the RAM 2020 in cache memory, and read and write data to the cache memory. Here, the cache memory performs some of the functions of the RAM 2020. Therefore, this division is excluded in the present embodiment. Cache memory is included in the RAM 2020, the memory, and/or the storage device.

The CPU 2000 also performs various types of processing on data read from the RAM 2020 including the operations, processing, condition determination, and information retrieval and substitution described in the present embodiment and indicated by a sequence of instructions in the program, and writes the results to the RAM 2020. For example, when performing a condition determination, the CPU 2000 compares various types of variables described in the present embodiment to other variables or constants to determine whether or not conditions such as greater than, less than, equal to or greater than, equal to or less than or equal to have been satisfied. When a condition has been satisfied (or not satisfied), the process branches to a different sequence of instructions or calls up a subroutine.

The CPU 2000 can also retrieve information stored in files and databases inside the memory device. For example, when a plurality of entries associating an attribute value for a second attribute to an attribute value for a first attribute, the CPU 2000 can retrieve an entry matching the conditions indicated by the attribute value of the first attribute among the plurality of entries stored in the storage device, and then obtain the attribute value of the second value associated with the first value satisfying a predetermined condition by reading the attribute value of the second attribute stored in the entry.

A program or module described above can be stored in a recording medium of an external unit. Instead of a flexible disk 2090 or a CD-ROM 2095, the recording medium can be an optical recording medium such as a DVD or CD, a magneto-optical recording medium such as MO, a tape medium, or a semiconductor memory such as an IC card. The recording medium can also be a storage device such as a hard disk or RAM provided in a server system connected to a dedicated communication network or the internet, and the program can be provided to the computer 1900 via the network.

The present invention was explained using an embodiment, but the technical scope of the present invention is not limited to the embodiment described above. The possibility of many changes and improvements to this embodiment should be apparent to those skilled in the art. Embodiments including these changes and improvements are within the technical scope of the present invention, as should be clear from the description of the claims.

The order of execution for operations, steps and processes in the devices, systems, programs and methods described in the claims, description and drawings was described using such terms as "previous" and "prior". However, these operations, steps and processes can be realized in any order as long as the output of the previous process is used by the subsequent process. The operational flow in the claims, description and drawing were explained using terms such as "first" and "next" for the sake of convenience. However, the operational flow does not necessarily have to be executed in this order.

The invention claimed is:

1. An information processing device having a lock function for restricting user operations, the information processing device comprising:
    a processor; and
    a memory coupled to the processor, wherein the memory comprises instructions which, when executed by the processor, cause the processor to:
    receive a first password, a specified location, and a specified route of travel to the specified location from a user;
    switch to a restricted mode restricting at least one function of the information processing device in response to receiving the first password, the specified location, and the specified route of travel;
    lock the information processing device responsive to determining that a distance between a current location of the information processing device and the specified route of travel has exceeded a predetermined threshold value;
    generate a second password different from the first password by extracting a portion of a string constituting the first password, wherein the second password can be entered in fewer operations than the first password;
    receive from the user the second password; and
    release the restricted mode responsive to the second password being inputted at the location specified by the user and determining that the information processing device has reached the specified location using the specified route of travel.

2. The information processing device according to claim 1, wherein releasing the restricted mode conprises allowing the information processing device to be used.

3. The information processing device according to claim 1, wherein the second password is input in fewer operations than the first password.

4. The information processing device according to claim 1, wherein the instructions further cause the processor to receive from the user a transit point passed to reach the specified location, and
    release the restricted mode and lock the information processing device responsive to the information processing device having reached the specified location without passing the transit point.

5. The information processing device according to claim 1, wherein the instructions further cause the processor to release the restricted mode and lock the information processing device responsive to a predetermined lock period having elapsed or a predetermined lock time having been reached in the restricted mode since the transition to the restricted mode.

6. The information processing device according to claim 5, wherein the instructions further cause the processor to receive an update operation during the lock period or at the lock time in the restricted mode, and
update the lock period or lock time in response to the update operation.

7. The information processing device according to claim 1, wherein the instructions further cause the processor to release the restricted mode in response to the specified location having been reached, and
transition to the restricted mode or lock the information processing device in response to a predetermined time having elapsed.

8. The information processing device according to claim 1, wherein the instructions further cause the processor to release the locked state in response to the first password being entered.

9. The information processing device according to claim 1, wherein the instructions further cause the processor to receive a plurality of specified locations, and
release the restrictions on functions at a reached location responsive to at least one of the specified locations having been reached.

10. The information processing device according to claim 9, further comprising:
a history storage configured to store the history of specified locations entered by the user; and
a display configured to display the history stored in the history storage,
wherein the instructions further cause the processor to receive a specified location selected by the user from the history.

11. A method, in an information processing device having a lock function for restricting user operations, the method comprising:
receiving a first password, a specified location, and a specified route of travel to the specified location from a user;
switching to a restricted mode restricting at least one function of the information processing device in response to receiving the first password, the specified location, and the specified route to travel;
locking the information processing device responsive to determining that a distance between a current location of the information processing device and the specified route of travel has exceeded a predetermined threshold value;
generating a second password different from the first password by extracting a portion of a string constituting the first password, wherein the second password can be entered in fewer operations than the first password;
receiving from the user the second password; and
releasing the restricted mode responsive to the second password being inputted at the location specified by the user and determining that the information processing device has reached the specified location using the specified route of travel.

12. The method according to claim 11, wherein releasing the restricted mode comprises allowing the information processing device to be used.

13. The method according to claim 11, further comprising:
receiving from the user a transit point passed to reach t he specified location; and
releasing the restricted mode and locking the information processing device responsive to the information processing device having reached the specified location without passing the transit point.

14. The method according to claim 11, further comprising releasing the restricted mode and locking the information processing device responsive to a predetermined lock period having elapsed or a predetermined lock time having been reached in the restricted mode since the transition to the restricted mode.

15. A computer program product comprising a non-transitory computer readable storage medium having a computer readable program stored therein, wherein the computer readable program, when executed on a computing device, causes the computing device to function as an information processing device having a lock function for restricting user operations, the program causing the computing device to:
receive a first password, a specified location, and a specified route of travel to the specified location from a user;
switch to a restricted mode restricting at least one function of the information processing device in response to receiving the first password, the specified location, and the specified route of travel;
lock the information processing device responsive to determining that a distance between a current location of the information processing device and the specified route of travel has exceeded a predetermined threshold value;
generate a second password different from the first password by extracting a portion of a string constituting the first password, wherein the second password can be entered in fewer operations than the first password;
receive from the user the second password; and
release the restricted mode responsive to the second password being inputted at the location specified by the user and determining that the information processing device has reached the specified location using the specified route of travel.

16. The computer program product according to claim 15, wherein the program further causes the computer to receive from the user a transit point passed to reach the specified location, and
release the restricted mode and lock the information processing device responsive to the information processing device having reached the specified location without passing the transit point.

17. The computer program product according to claim 15, wherein the program further causes the computer to release the restricted mode and lock the information processing device responsive to a predetermined lock period having elapsed or a predetermined lock time having been reached in the restricted mode since the transition to the restricted mode.

* * * * *